(12) United States Patent
Laumen et al.

(10) Patent No.: US 10,382,909 B2
(45) Date of Patent: *Aug. 13, 2019

(54) METHOD FOR TRANSMITTING MESSAGES IN A TELECOMMUNICATIONS NETWORK

(71) Applicant: IPCom GmbH & Co. KG, Pullach (DE)

(72) Inventors: Josef Laumen, Eching (DE); Joerg Reinecke, Sickte (DE); Frank Schange, Hildesheim (DE); Gunnar Schmidt, Blienstorf (DE)

(73) Assignee: IPCom GmbH & Co. KG (DE)

( * ) Notice: Subject to any disclaimer, the term of this patent is extended or adjusted under 35 U.S.C. 154(b) by 994 days.

This patent is subject to a terminal disclaimer.

(21) Appl. No.: 14/247,654

(22) Filed: Apr. 8, 2014

(65) Prior Publication Data

US 2014/0221027 A1 Aug. 7, 2014

Related U.S. Application Data

(60) Division of application No. 11/975,428, filed on Oct. 19, 2007, now Pat. No. 8,731,587, which is a
(Continued)

(30) Foreign Application Priority Data

Feb. 2, 2000 (DE) .................................. 10 004 260

(51) Int. Cl.
  *H04W 4/00* (2018.01)
  *H04W 4/14* (2009.01)
  (Continued)

(52) U.S. Cl.
  CPC ............... *H04W 4/14* (2013.01); *H04W 4/12* (2013.01); *H04W 72/005* (2013.01)

(58) Field of Classification Search
  CPC ... H04W 4/00–008; H04W 4/12; H04W 4/14; H04W 4/16; H04W 4/18
  (Continued)

(56) References Cited

U.S. PATENT DOCUMENTS 5,625,670 A 4/1997 Campana et al.
5,742,668 A 4/1998 Pepe et al.
(Continued)

FOREIGN PATENT DOCUMENTS

EP 777394 6/1997
EP 1091601 4/2001
(Continued)

OTHER PUBLICATIONS

WAP Service Indication, Version 08—Nov. 1999, Wireless Application Protocol Service Indication Specification, Nov. 1999, 26 pages.
(Continued)

*Primary Examiner* — Stephen M D Agosta
(74) *Attorney, Agent, or Firm* — Kilpatrick Townsend & Stockton LLP

(57) ABSTRACT

The present invention provides a method for transmitting messages in a telecommunications network, in which a first message service and a second message service are available. Dedicated messages of the first message service are sent, using messages of the second message service. The method of the present invention has the particular advantage, that an optimized transmission scheme can be maintained for the dedicated messages of the first message service.

20 Claims, 4 Drawing Sheets

Related U.S. Application Data continuation of application No. 10/182,687, filed as application No. PCT/DE01/00285 on Jan. 25, 2001, now Pat. No. 7,333,822.

(51) Int. Cl.
 *H04W 4/12* (2009.01)
 *H04W 72/00* (2009.01)

(58) Field of Classification Search
 USPC ....... 455/412.1, 412.2, 414.1, 418–420, 466; 370/310, 310.2, 312, 313, 338
 See application file for complete search history.

(56) References Cited

U.S. PATENT DOCUMENTS

| | | | |
|---|---|---|---|
| 5,905,879 A | | 5/1999 | Lambrecht |
| 5,946,629 A | * | 8/1999 | Sawyer et al. ............... 455/466 |
| 5,974,449 A | * | 10/1999 | Chang et al. ................. 709/206 |
| 6,038,296 A | | 3/2000 | Brunson et al. |
| 6,052,442 A | * | 4/2000 | Cooper et al. ............. 379/88.19 |
| 6,195,345 B1 | | 2/2001 | Kramer |
| 6,205,330 B1 | | 3/2001 | Winbladh |
| 6,233,318 B1 | * | 5/2001 | Picard et al. .............. 379/88.17 |
| 6,556,586 B1 | | 4/2003 | Sipila |
| 6,721,398 B1 | | 4/2004 | Pitcher |
| 6,728,548 B1 | | 4/2004 | Willhoff |
| 6,795,711 B1 | | 9/2004 | Sivula |
| 7,333,822 B2 | | 2/2008 | Laumen et al. |
| 8,731,587 B2 | | 5/2014 | Laumen et al. |
| 2003/0109269 A1 | | 6/2003 | Laumen et al. |
| 2008/0274758 A1 | | 11/2008 | Laumen et al. |

FOREIGN PATENT DOCUMENTS

| | | |
|---|---|---|
| JP | 11187155 | 7/1999 |
| JP | 11511608 | 10/1999 |
| WO | 9708906 | 3/1997 |
| WO | 9952247 | 10/1999 |
| WO | 9966746 | 12/1999 |
| WO | 0113656 | 2/2001 |

OTHER PUBLICATIONS

3G TS 22.140 Version 0.1.0, version 0.1.0, Multimedia Messaging Service, Jul. 1999.
3G TS 23.040 Version 3.2.0, Oct. 1999.
3G TS 23.040 Version 3.3.0, Technical Realization of the Short Message Service (SMS), 3rd Generation Partnership Project; Technical Specification Group Terminals, 3G TS 23.040 V3.3.0, Dec. 1999, pp. 1-119.
3G TS 23.140, Version 0.2.0, 3rd Generation Partnership Project: Technical Specification Group Terminals; Multimedia Message Service (MMS); Functional Description; Stage 2, Nov. 1999.
3G TS 23.140 Version 1.0.0, Multimedia Messaging Service (MMS); Functional Description; Stage 2, 3rd Generation Partnership Project; Technical Specification Group Terminals, Dec. 1999, pp. 1-26.
3G TS 23.140 Version 3.0.1 (Mar. 2000), Release 1999, Mar. 2000, 1 sheet of p. 5.
3G TS 24.011 Version 3.1.0, Dec. 1999.
3G TS 24.011 version 3.1.0, Point-Point (PP) Short Message Service (SMS) Support on Mobile Radio Interface, 3rd Generation Partnership Project; Technical Specification Group Core Network, 3G TS 24.011 v33.1.0, Dec. 1999, pp. 1-88.
Analysis of Patents Declared as Essential to GSM as of Jun. 6, 2007, Fairfield Resources International, Dec. 31, 2007.
Analysis of Patents Declared as Essential to WCDMA as of Dec. 31, 2005, Fairfield Resources International, Nov. 21, 2007.
Decision on the Commission, Jun. 15, 2005.
Declaration of Karl Heinz Rosenbrock, Aug. 20, 2007.
Draft T2#6/SMG4 Report V0.4 (Oct. 1999), Kyongju Korea, Oct. 4, 1999, 1 sheet of p. 6.
ETSI Guide on IPRs, Jan. 25, 2007.
ETSI Rules of Procedure, Nov. 22, 2006.
ETSI Rules of Procedure, Mar. 29, 2007.
Expert Report and Disclosure of Sir Jeremy Lever KCMG QC and Anneli Howard on behalf of Respondents, *Nokia Corporation and Nokia, Inc.*, v. *Qualcomm Incorporated*, In the Court of Chancery of the State of Delaware in and for New Castle County, Jan. 11, 2007.
Expert Report of Sir David Edwards and James Segan, Nokia Corproation, Nokia Incorporated and Qualcomm Incorporated, Court of Chancery of the State of Delaware (at least as early as Sep. 29, 2006).
Figures Provided by Strategy Analytics (at least as early as Dec. 1, 2006).
First Instance Decision in European Patent Office opposition proceedings, EP-B 1256241 dated Dec. 30, 2009.
GSM 03.40 V7.1.0, Digital cellular telecommunications system (Phase 2+); Technical realization of the Short Message Service (SMS); Point-to-Point (PP), Nov. 1998.
IPR Online Database, Aug. 2, 2008.
Statement of Federal Trade Commission (at least as early as Mar. 27, 2002).
WAP Architecture version, Apr. 30, 1998.
WAP Push Message, Version 16, Wireless Application Protocol Push Message Specification, Aug. 1999.
WAP Push OTA Protocol, Version 08, Wireless Application Protocol Push OTA Protocol Specification, Nov. 1999.
WAP WCMP version, Jun. 1998.
WAP WDP version, Apr. 30, 1998, pp. 1-10, p. 19, pp. 33-36, pp. 47-50.
WAP WSP Version 30, Apr. 30, 1998, pp. 1-11, p. 20, p. 21, p. 28, p. 29, pp. 60-95.
Wireless Application Protocol, Wireless Control Message Specification, Wireless Application Protocol Forum, Ltd. (WAP WCMP Spec.), Aug. 4, 1999.
Wireless Application Protocol, Wireless Session Protocol Specification, Wireless Application Protocol Forum, Ltd., (WAP WSP Spec.'), Apr. 30, 1998.
Peterson et al., Computer Networks—A Systems Approach, Morgan Kaufmann, Dec. 1996, pp. 29-35.
U.S. Appl. No. 10/182,687, Advisory Action dated Dec. 20, 2005, 3 pages.
U.S. Appl. No. 10/182,687, Advisory Action dated Nov. 7, 2006, 3 pages.
U.S. Appl. No. 10/182,687, Final Office Action dated Jun. 6, 2007, 5 pages.
U.S. Appl. No. 10/182,687, Final Office Action dated Jul. 8, 2005, 9 pages.
U.S. Appl. No. 10/182,687, Final Office Action dated Jul. 21, 2006, 9 pages.
U.S. Appl. No. 10/182,687, Non-Final Office Action dated Feb. 23, 2007, 10 pages.
U.S. Appl. No. 10/182,687, Non-Final Office Action dated Mar. 16, 2005, 11 pages.
U.S. Appl. No. 10/182,687, Non-Final Office Action dated Apr. 3, 2006, 8 pages.
U.S. Appl. No. 10/182,687, Notice of Allowance dated Sep. 19, 2007, 6 pages.
U.S. Appl. No. 11/975,428, Advisory Action dated Sep. 12, 2012, 3 pages.
U.S. Appl. No. 11/975,428, Advisory Action dated Aug. 1, 2011, 3 pages.
U.S. Appl. No. 11/975,428, Final Office Action dated Apr. 20, 2011, 10 pages.
U.S. Appl. No. 11/975,428, Final Office Action dated Jul. 2, 2012, 14 pages.
U.S. Appl. No. 11/975,428, Restriction Requirement dated Mar. 9, 2011, 7 pages.
U.S. Appl. No. 11/975,428, Final Office Action dated Sep. 20, 2013, 14 pages.

(56) References Cited

OTHER PUBLICATIONS

U.S. Appl. No. 11/975,428, Non-Final Office Action dated Aug. 23, 2010, 8 pages.
U.S. Appl. No. 11/975,428, Non-Final Office Action dated Jun. 11, 2013, 9 pages.
U.S. Appl. No. 11/975,428, Notice of Allowance dated Jan. 8, 2014, 8 pages.
U.S. Appl. No. 95/001,211, Decision on Appeal dated May 30, 2013, 23 pages.
U.S. Patent Re-Examination Application No. 95/001,211, Non-Final Office Action dated Nov. 9, 2009, 29 pages.
U.S. Patent Re-Examination Application No. 95/001,211, Right of Appeal Notice dated Aug. 27, 2010, 19 pages.

* cited by examiner

METHOD FOR TRANSMITTING MESSAGES IN A TELECOMMUNICATIONS NETWORK

RELATED APPLICATION DATA

This application is a divisional of U.S. patent application Ser. No. 11/975,428 filed Oct. 19, 2007, allowed, which is a continuation of U.S. patent application Ser. No. 10/182,687 filed Oct. 29, 2002, now U.S. Pat. No. 7,333,822, which was a National Stage Application of PCT International Application of PCT/DE2001/000285 filed Jan. 25, 2001, which claimed priority to German Patent Application No. 10004260.0 filed Feb. 2, 2000, all of which are incorporated herein by reference in their entirety.

BACKGROUND OF THE INVENTION

The present invention relates to a method for transmitting messages in a telecommunications network, in which a first message service and a second message service are available. Although it may be used in principle for any multimedia message service and telecommunications network, the present invention and the problem on which it is based are explained with regard to the MMS service (MMS=Multimedia Messaging Service), which is presently specified within the framework of the standardization of 3GPP (3rd Generation Project Program) and can be used, in particular, in the GSM system (GSM=Global System for Mobile Communications) and the UMTS system (UMTS=Universal Mobile Telecommunication System).

Short message services, which are used to send a short message to a subscriber of the telecommunications network without first having to establish a telecommunications connection to this subscriber, are already generally known in telecommunications networks. This is especially important in mobile radio communication systems such as GSM, since their subscribers can often not be reached. In this context, incoming short messages for the subscriber are stored by a telecommunications carrier of the telecommunications network, when the subscriber cannot be reached. At a later time when the subscriber can be reached again, the short message is then automatically transmitted to this subscriber.

The SMS service (SMS=Short Message Service) is known as a short message service following the GSM standard. In this context, up to 160 7-bit ASCII message characters (ASCII=American Standard Code for Information Interchange) may be transmitted in a short message. The transmission of longer texts is possible with the aid of concatenated short messages. Since only text transmission according to the GSM standard is provided, binary data, such as audio data, image data, or the like, must be converted to text format when they are transmitted, and reconverted to binary format after being received In so doing, it is only possible to access the entire content of a short message. In this manner, data of the short message, which may not be desired by the addressed subscriber, may be transmitted to him or her. He or she only receives an overview of the content of the short message after having received the complete short message from the telecommunications carrier.

FIG. 4 shows the principal structure of a first type A of an SMS short message in GSM. In general, an SMS short message SM of the first type A includes a header SM-H and a data portion SM-D. Header SM-H includes signaling inputs and the receiver address in the case of a message to be sent, and the sender address in the case of a message to be received. Data portion SM-D includes the actual message to be transmitted. Transmitters and receivers are identified by the MSISDN (Mobile Subscriber Integrated Services Digital Network) number in accordance with GSM 03.40 V7.1.0 (11/1998) Technical Realization of the Short Message Service (SMS); Point-to-Point (PP) and 3G 23.040 V3.2.0 (10/1999) Technical Realization of the Short Message Service (SMS); and Point-to-Point (PP).

A second header, the so-called user data header SM-DH, may optionally be present in data portion SM-D. If this is the case, then it is indicated by a corresponding signaling input in header SM-H. Various types of SMS user data headers are already specified in GSM 03.40/3G 23.040. Different types of user data headers SM-DH are distinguished by an identification element in user data header SM-DH.

The concatenation of short messages SM is controlled, for example, by such a user data header SM-DH (identifier: "08" hexadecimal). A further example of such a user data header SM-DH is the "Wireless Control Message Protocol", which is indicated by the identifier "09" in hexadecimal notation. This is needed for the Wireless Application Protocol (WAP).

FIG. 5 shows the principal structure of a second type B of an SMS short message in GSM. In this case, an SMS short message SM' generally includes a header SM-H' and a data portion SM-D', as well. Header SM-H' again includes signaling inputs and the receiver address in the case of a message to be sent, and the sender address in the case of a message to be received. Data portion SM-D' includes the actual message to be transmitted.

A field, which is 8 bits wide and referred to as the TP-PID (Transfer Protocol-Protocol Identifier), already exists in header SM-H'. Parameter TP-PID is generally used to establish the applied protocol. In particular, it is used to realize telematic interworking or determine how messages are handled in the cellular phone or SMSC (short message service center). In telematic interworking, the TP-PID is a bit pattern of the form <001 xxxxx>, that is, bit 7=0, bit 6=0, and bit 5=1. If this bit pattern appears in the TP-PID of header SM-H' of an SMS short message SM' sent by a cellular phone, then the SMSC (Short Message Service Center) is induced to convert the present SMS to a different data format and/or to carry out a certain communications protocol. In this manner, e.g. a fax of the group 3 can be sent by a cellular phone to a fax machine in the fixed network. In this case, the value of the entire TP-PID octet is <00100010>. If this bit pattern appears in the TP-PID of header SM-H' of an SMS short message SM' received by a cellular phone, then the SMSC has received a message from a non-SMS telematic service and converted it to an SMS. In this manner, e.g. an Internet e-mail may be sent from any e-mail account in the fixed network, via the service center, to a cellular phone. In this case, the value of the received TP-PID octet is <00110010>.

In the case of handling messages, the TP-PID is a bit pattern of the form <01 xxxxxx>, that is, bit 7=0, and bit 6=1. If this bit pattern appears in the TP-PID of the header SM-H' of an SMS short message SM' received by a cellular phone, then the SMSC causes the cellular phone to handle the message in a certain manner. In this manner. e.g. a cellular phone can be induced by the SMSC to relay the received message to the SIM (subscriber identity module), where it is then processed further in accordance with the SIM application toolkits. In this case, the value of the received TP-PID octet is <0 1 1 1 1 1 1 1>. If this bit pattern appears in the TP-PID of the header SM-H' of an SMS short message SM' sent by a cellular phone, then, e.g. in the case of the bit pattern <01000001>, the SMSC is caused to overwrite an already present short message of the same cellular phone with the received short message.

The MMS service is a service, which is intended to make possible the transmission and reception of multimedia messages, using a cellular phone. The current (temporary) state of standardization of MMS is found in 3G TS 23.140, MMS Stage 2, v.1.0.0. In contrast to an SMS short message, a multimedia message (MM) should be limited to neither a certain length, nor the display of text. An MM should instead support various types of media.

The MMS relay has a central function in the MMS service. As shown in 3G TS 23.140, MMS Stage 2, v.1.0.0, this element may be connected to various servers (e.g. an email server, fax server, voice mailbox, and MMS server), using a large variety of media. Its purpose is to grant the mobile user access to all of the information/messages on the above-mentioned servers. Thus, the MMS relay allows the mobile user access to his e-mails on the e-mail server, or to faxes "waiting" for him on a fax server, or to voice messages recorded on his voice mailbox, etc. Aside from the receipt of messages, it is also intended that the mobile user be able to write messages and send these to the desired recipient via the MMS relay.

3G TS 23.140, MMS Stage 2, v.1.0.0, provides for, inter alia, the user of the MMS service logging on to his MMS service provider (session establishment). He can then obtain a receipt for the log-on (receipt), depending on his service profile. If unread messages for him are on his MMS server, then he can receive a message (notification) about it, to be sure, in accordance with his service profile as well. In this connection, an MMS server may stand for one or more arbitrary servers, e.g. one or more e-mail servers, fax servers, possibly special MMS servers (if an independent MM format is standardized), or arbitrary combinations of these.

In the same way, he can receive a message in accordance with his service profile, when a new message arrives at the MMS server during an MMS session. If his profile is set up such that he does not automatically receive notification of unread and/or new MM messages, then, according to the specification, the MMS service should allow the user to explicitly request such a notification from the MMS relay (explicit notification query). In the service profile, the user may also specify if he would like to receive, from the service provider, a confirmation of the success of transmitting the MM's to other users.

In this connection, one may distinguish between two types. First of all, the user may receive a reply from the MMS relay indicating that his sent message was successfully sent to the relay via the air interface: ACK/NACK submission 1: positive/negative acknowledgment of submission to relay. In addition, he can receive a reply from the receiver and/or from the MMS relay indicating that the receiver successfully received the message: ACK/NACK submission 2: positive/negative end-to-end acknowledgment of submission to receiver. The MMS service should also offer the possibility of the service provider (the MMS relay) receiving a reply regarding the success/failure of the delivery of an MM to a subscriber: ACK/NACK delivery. 3G TS 23.140, MMS Stage 2, v.1.0.0, 3GPP TSG T WG 2, November 1999, also provides for the triggering of automatic downloading of messages by an SMS (pull-push).

The above-mentioned functionality and messages regarding the MM are written in the applications level, but their implementation is open. All of this functionality and these messages, as well as similar functionality and messages, may be implemented in many different forms. The general problem of the present invention is that, in the MMS message service, different types of messages are sent, such as the above-mentioned notifications from the system and actual user messages, whereby the latter may also be quite varied in their content, for instance, short text messages or long video, audio, or other messages. As a result, there is no transmission scheme that is equally optimized for all messages.

SUMMARY OF THE INVENTION

The idea forming the basis of the present invention is that predetermined messages of the first message service are sent, using messages of the second message service. Certain methods of the present invention have the particular advantage that an optimized transmission scheme may be maintained for the dedicated messages of the first message service. In a specific example, a transmission scheme that provides for simple sending is selected by the SMS message service, for the dedicated messages in the MMS. Therefore, line-oriented transmission, e.g. using GSM circuit switched data or GPRS general packet radio service or UMTS circuit or packet switched data that are always associated with a great deal of overhead for setting up a connection/session, is dispensed with. Thus, according to certain embodiments, messages of a second message service are sent between a transmitter and a receiver without line-oriented transmission.

According to certain embodiments, a dedicated, second group of messages of the first message service are sent between the transmitter and the receiver, using line-oriented transmission. The first message service may be a multimedia message service, preferably the MMS message service. The second message service may be a short message service, preferably the SMS message service. In the context where the first message service is the MMS message service and the second message service is this SMS message service, the dedicated, first group of messages of the first message service includes at least one of the following messages: dedicated MMS user messages (e.g. short text messages); notification of the presence of a message on the MMS server (notification); logging on to an MMS session (session establishment); receipt for this log-on (receipt); explicit request for a notification from the MMS relay (explicit notification query); confirmation of the reception of sent MM's in the relay (ACK/NACK_submission_1); confirmation of the success in sending an MM's to other users (ACK/NACK_submission_2); acknowledgment of the success/failure in delivering an MM (ACK/NACK_delivery); and triggering the automatic M M-download (pull-push).

An advantage of such an implementation is that SMS already exists, and the use of this service therefore facilitates the market introduction and acceptance of MMS. SMS makes available a reliable service for the above-mentioned notifications. When SMS is used, there is no need for additional signaling for transmitting notifications. SMS offers a bandwidth-friendly service for such simple notifications, this service also being simultaneously usable for ongoing connections or sessions in the GSM, GPRS, and UMTS system. SMS is also available in second generation cellular phones (e.g. GSM). Therefore, a user may use essential features of the MMS service without necessarily requiring a (an expensive) third generation cellular phone (e.g. UMTS).

According to certain embodiments, an SMS short message is provided with a data portion, which has at least one of the following elements for establishing the message of the first message service: identification of the type of message of the first message service and/or content of the message of the first message service. The length of a message of the first message service may be specified as a further element for establishing the message of the first message service. At least a portion of the elements may be accommodated in a user-data header of the SMS short message. In some embodiments the user-data header may be constructed in WCMP format, in which the message of the first message service is embedded. In some embodiments, an identifier for indicating the presence of a message of the first message service is included in the data portion the SMS short message.

BRIEF DESCRIPTION OF THE DRAWING

Exemplary embodiments of the present invention are shown in the drawing and are explained in detail in the following description. The figures show.

DETAILED DESCRIPTION

Figure 1:
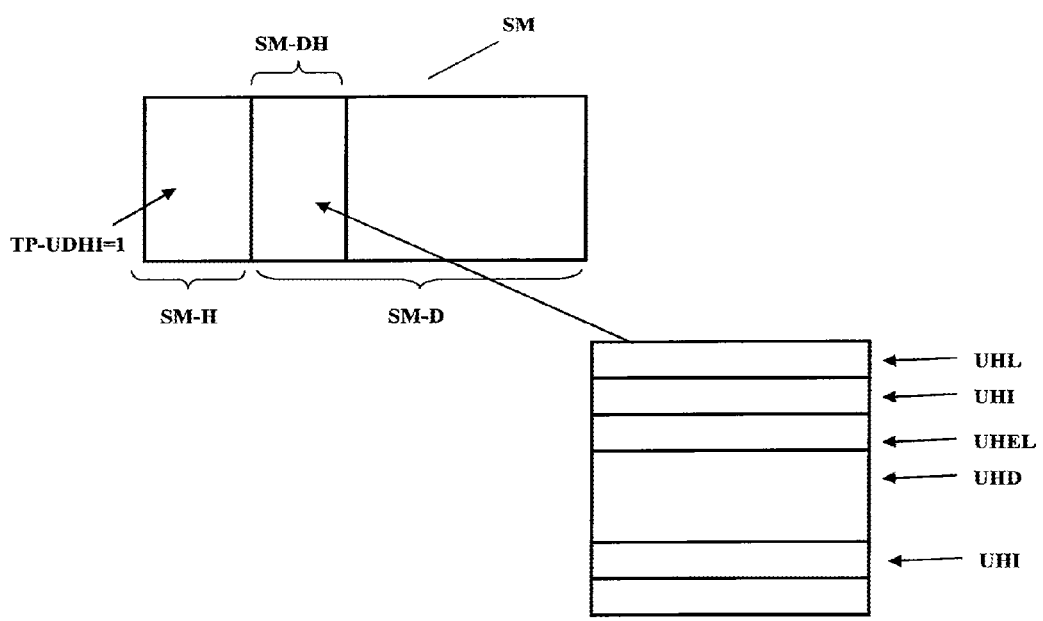
FIG. 1 illustrates the structure of an exemplary SMS short message of the first type A in GSM, in a first specific embodiment of the method according to the present invention.

In the figures, identical reference symbols denote identical or functionally equivalent elements. FIG. 1 shows the structure of an SMS short message of the first type A in GSM, in a first specific embodiment of the method according to the present invention. In the first specific embodiment according to FIG. 1, the first message service is the MMS message service, the second message service is the SMS message service, and the dedicated, first group of messages of the MMS message service is: dedicated MMS user messages (e.g. short text messages); notification of the presence of a message on the MMS server (notification); logging on to an MMS session (session establishment); receipt for this log-on (receipt); explicit request for a notification from the MMS relay (explicit notification query); confirmation of the reception of sent MM's in the relay (ACK/NACK_submission_1); confirmation of the success in sending MM's to other users (ACK/NACK_submission_2); acknowledgment of the success/failure in delivering an MM (ACK/NACK_delivery); and triggering the automatic MM-download (pull-push).

In particular, FIG. 1 shows user-data header SM-DH of a type-A SMS short message for establishing a session with the MMS service. In header SM-H, the presence of a user-data header SM-DH is indicated by flag TP-UDHI=1 in accordance with the standards GSM 03.40 V7.1.0 (11/1998) Technical Realization of the Short Message Service (SMS); Point-to-Point (PP) und 3G 23.040 V3.2.0 (10/1999) Technical Realization of the Short Message Service (SMS); and Point-to-Point (PP).

The formatting of user-data header SM-DH also conforms to the standards. It begins with user-data header length UHL. This is followed by identification UHI of the first header element which, for example, is the MMS session establishment header (hex. 22) in this case. This is then followed by length UHEL of the first header element which, in this case, is therefore the necessary length for the MMS session establishment header information. Last come the MMS session establishment header data fields UHD, which are, in this case, the user ID and the user profile ID. Using the user ID, the user authenticates himself to his service provider, and using the profile ID, he selects the service/user profile desired for this MMS session. This may be succeeded by further user data header elements, e.g. for SMS concatenation, and specifically, beginning with identification UHI' of the second header element and so on, the further user data header elements being constructed in a manner analogous to the first header element.

For the case in which only the MMS session establishment header (hex. 22 in the example) is present, the above-mentioned standard stipulates that the necessary SMS header/SMS user data header fields be encoded as follows: SMS header: TP-UDHI=1 (user data header is present). SMS user data header: UDHL=user data header length UHL; IEI=UHI=22 (user data header identification=hex. 22 for MMS session establishment); IEIDL=length of this user data header element UHEL further information: user ID, profile ID; SMS data: empty, or additional SMS user data header or text message.

A unique user data header indicator UHI must be defined for each type of dedicated MMS message. A mapping table could appear as follows:

TABLE 1

Exemplary Assignment of Information Element Identifiers (IEI)

| Type of Dedicated MMS Message | IEI-Code |
| --- | --- |
| MMS user message | 20 |
| MMS notification | 21 |
| MME session establishment | 22 |
| MMS receipt (of establishment) | 23 |
| MMS explicit notification-query | 24 |
| MMS ACK/NACK of submission (1) | 25 |
| MMS ACK/NACK of submission (2) | 26 |
| MMS ACK/NACK of delivery | 27 |
| MMS pull-push | 28 |

Figure 2:
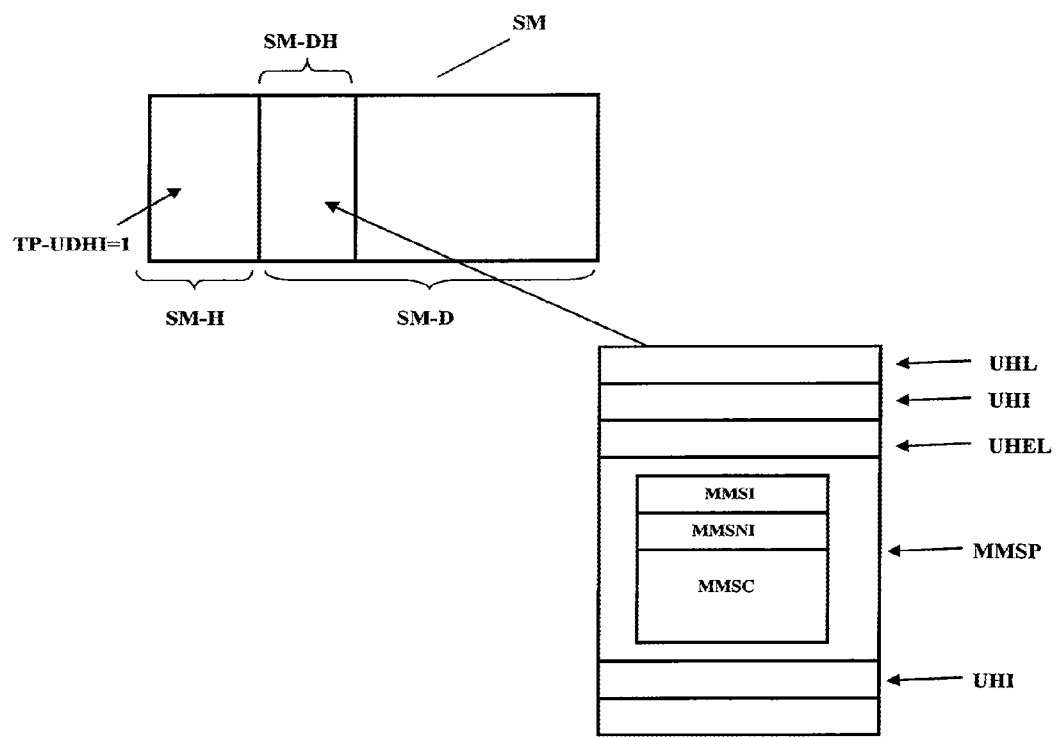
FIG. 2 illustrates the structure of an exemplary short message of the first type A in GSM, in a second specific embodiment of the method according to the present invention.

FIG. 2 shows the structure of an SMS short message of the first type A in GSM, in a second specific embodiment of the method according to the present invention. The second specific embodiment according to FIG. 2 is similar to the first specific embodiment, but, in the example for the MMS session establishment, it includes a WCMP (wireless control message protocol) user data header having an embedded MMS protocol. Identification UHI of this user data header is done in the form of hexadecimal 09, in accordance with the standards GSM 03.40 V7.1.0 (11/1998) Technical Realization of the Short Message Service (SMS); Point-to-Point (PP) and 3G 23.040 V3.2.0 (10/1999) Technical Realization of the Short Message Service (SMS); and Point-to-Point (PP).

As shown in FIG. 2, user data header SM-DH begins with user data header length UHL. This is then followed by identification UHI of the first header, which is now, in this case, hex. 09 for WCMP. This is then followed by the length of this user data header element UHEL, which is, in this case, the necessary length of the WCMP header (including the entire embedded MMS protocol). Last come the WCMP fields in the MMS protocol, which are referred to here as MMSP. These first of all include a designation MMSI (also called an MMS identifier), which indicates that an MMS protocol is implemented with the help of this WCMP field. The subsequent identifier MMSNI indicates the type of this MMS protocol. It therefore specifies what type of MMS message it is, and consequently corresponds to the content of parameter UHI in the first specific embodiment. Parameter MMSC indicates, in turn, the user ID and profile ID in the example of MMS session establishment.

Similarly to the first exemplary embodiment, a unique indicator must be defined for each type of message. A mapping table could look like this:

TABLE 2

Exemplary Assignment of MMSNI Codes

| Type of Dedicated MMS Message | MMSNI-Code |
|---|---|
| MMS user message | 0 |
| MMS notification | 1 |
| MMS session establishment | 2 |
| MMS receipt (of establishment) | 3 |
| MME explicit notification-query | 4 |
| MMS ACK/NACK of submission (1) | 5 |
| MMS ACK/NACK of submission (2) | 6 |
| MMS ACK/NACK of delivery | 7 |
| MMS pull-push | 8 |

Figure 3:
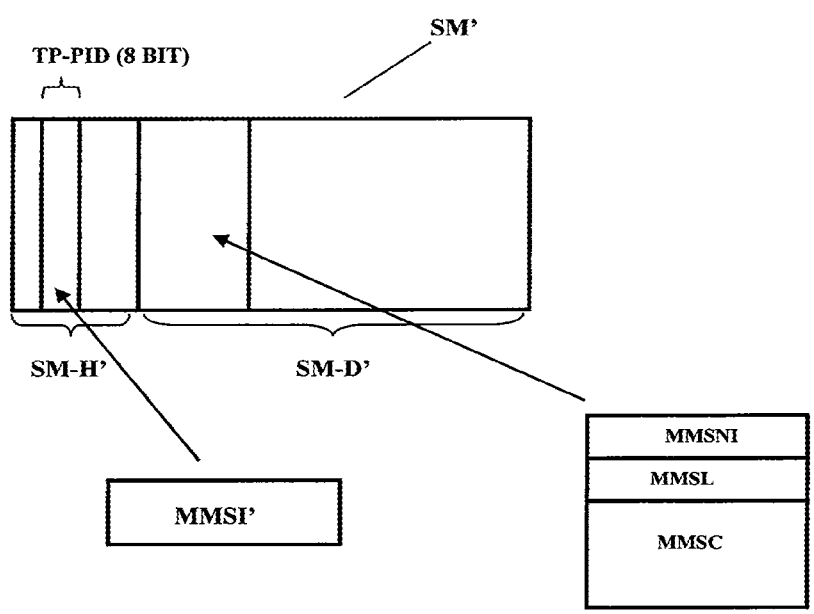
FIG. 3 illustrates the structure of an exemplary SMS short message of the second type B in GSM, in a third specific embodiment of the method according to the present invention.
Figure 4:
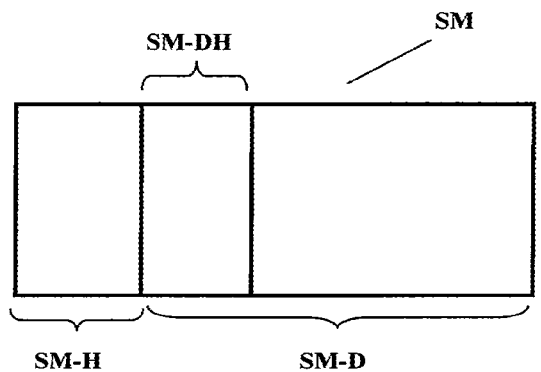
FIG. 4 illustrates the principal structure of an exemplary first type A of SMS in GSM.
Figure 5:
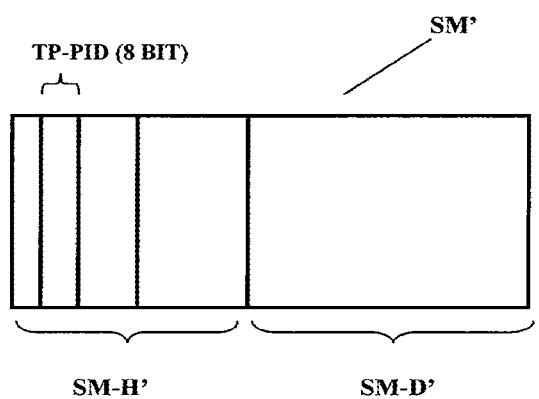
FIG. 5 illustrates the principal structure of an exemplary second type B of SMS short message in GSM.

FIG. 3 shows the structure of an SMS short message of the second type B in GSM, in a third specific embodiment of the method according to the present invention. While the user data header was used in the two aforementioned embodiments to produce MMS notifications, it is also conceivable to use the TP-PID for identifying such a notification. In this case, the service center participates in the protocol while, in the two aforementioned specific embodiments, it only forwards the data in a transparent manner.

In the present example, it is assumed that the MMS relay executes a special MMS protocol with the SMSC, i.e. notifications for the user are transmitted from the MMS relay to the SMSC in a special MMS format, in order to transmit these messages to the user or transmit notifications from the user to the MMS relay, via the SMSC. In the SMSC, these notifications are then converted from SMS into the MMS format (and vice versa), in a manner similar to how SMS can be converted to fax today. To this end, parameter TP-PID in SMS short message SM' is set to a specific value MMSI for the MMS service. This specification establishes for the transmitter and receiver, that further information specific to MMS protocol follows in the user data. The appearance of these may be as follows.

An additional MMS message identifier MMNSI' indicates the type of notification, e.g. an MMS session establishment which is sent from the user to the MMS relay. For example, these identifiers MMNSI' may again be constructed like the parameters MMSNI in Table 2, and may take up 8 bits for display. A field MMSL, which is, e.g. 8 bits wide, defines the length of the following MMS information items. MMSC. These are independent of the type of notification. In the case of the MMS session establishment, the user ID and the ID of the desired profile may be communicated in MMSC, as mentioned.

Depending on whether telematic interworking or message handling is desired, the TP-PID may be present in the form <001xxxxx> (e.g. <00110011>) or <01 xxxxxx> (e.g. <01001000>).

Although the present invention is described above, based on preferred exemplary embodiments, the method is not limited to them, but can be modified in a plurality of ways. In particular, the present invention is not limited to the mentioned telecommunications networks and the services available in them. In addition, the structure of the short messages may be varied. Other criteria, such as network utilization, etc. may also be used to determine which messages of the first message service are to be sent by the second message service.

What is claimed is:

1. A method for transmitting multimedia messages of a multimedia message service using short messages of a short message service in a telecommunications network, the method comprising:
    embedding a multimedia message of a multimedia message service within a data portion of a short message of a short message service, the data portion following a header portion of the short message;
    including in said short message a first identifier indicating that said multimedia message is present in said data portion;
    including in the data portion of the short message a second identifier indicating a type of said multimedia message; and
    transmitting the short message to a receiver.

2. The method of claim 1, wherein the first identifier is included in the header portion of the short message.

3. The method of claim 1, wherein the first identifier is included in the data portion of the short message.

4. The method of claim 1, wherein the first identifier and the second identifier are included in a user data header of the data portion.

5. The method of claim 1, wherein the first identifier, the second identifier and the multimedia message are included in a user data header of the data portion.

6. The method of claim 1, wherein the multimedia message service is MMS.

7. The method of claim 1, wherein the multimedia message is selected from a predefined group of MMS messages.

8. The method of claim 7, wherein the predefined group of MMS messages comprises MMS notification messages, MMS session establishment messages, MMS session establishment receipt messages, MMS notification-query messages, MMS acknowledgement messages, and MMS pull-push messages.

9. The method of claim 1, wherein the short message service is SMS.

10. The method of claim 1, wherein the receiver is at least a portion of: a cellular phone, a short message service center, or an MMS relay.

11. A transmitter capable of transmitting multimedia messages of a multimedia message service using short messages of a short message service in a telecommunications network, wherein the transmitter is configured to:
    embed a multimedia message of a multimedia message service within a data portion of a short message of a short message service, the data portion following a header portion of the short message;
    include in said short message a first identifier indicating that said multimedia message is present in said data portion;
    include in the data portion of the short message a second identifier indicating a type of said multimedia message; and
    transmit the short message to a receiver.

12. The transmitter of claim 11, wherein the first identifier is included in the header portion of the short message.

13. The transmitter of claim 11, wherein the first identifier is included in the data portion of the short message.

14. The transmitter of claim 11, wherein the first identifier and the second identifier are included in a user data header of the data portion.

15. The transmitter of claim 11, wherein the first identifier, the second identifier and the multimedia message are included in a user data header of the data portion.

16. The transmitter of claim 11, wherein the multimedia message service is MMS.

17. The transmitter of claim 11, wherein the multimedia message is selected from a predefined group of MMS messages.

18. The transmitter of claim 17, wherein the predefined group of MMS messages comprises MMS notification messages, MMS session establishment messages, MMS session establishment receipt messages, MMS notification-query messages, MMS acknowledgement messages, and MMS pull-push messages.

19. The transmitter of claim 11, wherein the short message service is SMS.

20. The transmitter of claim 11, wherein the receiver is at least a portion of: a cellular phone, a short message service center or an MMS relay.

\* \* \* \* \*